(12) United States Patent
Brown et al.

(10) Patent No.: US 7,280,725 B2
(45) Date of Patent: Oct. 9, 2007

(54) FIBER OPTIC FURCATION TUBE AND METHOD

(75) Inventors: Troy Brown, Prior Lake, MN (US); Steven C. Zimmel, Minneapolis, MN (US); Justin R. Horton, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/868,663

(22) Filed: Jun. 15, 2004

(65) Prior Publication Data

US 2005/0276551 A1 Dec. 15, 2005

(51) Int. Cl.
*G02B 6/44* (2006.01)

(52) U.S. Cl. ............... 385/100; 385/102; 385/103; 385/106

(58) Field of Classification Search ............. 385/100, 385/102, 103, 106
See application file for complete search history.

(56) References Cited

U.S. PATENT DOCUMENTS

| 4,626,067 | A | 12/1986 | Watson |
| 5,231,688 | A | 7/1993 | Zimmer |
| 5,838,861 | A | 11/1998 | Bunde |
| 5,903,693 | A * | 5/1999 | Brown ............... 385/100 |
| 5,970,195 | A | 10/1999 | Brown |
| 6,278,831 | B1 | 8/2001 | Henderson et al. |
| 6,389,214 | B1 | 5/2002 | Smith et al. |
| 6,438,299 | B1 | 8/2002 | Brown et al. |
| 6,909,828 | B2 * | 6/2005 | Zimmel et al. ............. 385/100 |

FOREIGN PATENT DOCUMENTS

| EP | 0 520 946 A1 | 12/1992 |
| EP | 0 544 004 A1 | 6/1993 |
| EP | 0 862 072 A2 | 9/1998 |
| WO | WO 00/08498 | 2/2000 |

OTHER PUBLICATIONS

Photographs of a coaxial cable splitter device admitted as prior art as of Jul. 2, 2003 (6 pages).

* cited by examiner

*Primary Examiner*—Jennifer Doan
(74) *Attorney, Agent, or Firm*—Merchant & Gould, P.C.

(57) ABSTRACT

A furcation tube including a central channel for receiving a fiber optic drop cable in a first end and an upjacket in a second end to transition an optical fiber within the drop cable into the upjacket for termination. A method of transitioning an optical fiber from a drop cable to a smaller upjacket.

23 Claims, 3 Drawing Sheets

FIBER OPTIC FURCATION TUBE AND METHOD

TECHNICAL FIELD

The present invention relates generally to optical fiber cable devices and methods. More specifically, the present invention relates to furcation tubes and methods for use with optical fiber cables.

BACKGROUND

Optical fibers are often carried within cables including a rugged exterior sheathing and maybe a linear or parallel strength member. Such cables may be used when optical fibers need to be carried over aerial supports to reach a destination where fiber optic connectivity is desired. Such cables may also be used when optical fibers are buried within or pulled through underground conduits to reach a destination where fiber optic connectivity is desired. When these sturdy and protective cables reach the desired location, the fibers within the cables need to be broken out of the rugged casing so that the fibers may be connected with drop cables or customer equipment at the location. Often, the optical fiber within such a cable will be carried in a linear passage or lumen within the cable which then be filled with a fluid or other substance providing protection against water infiltration of the lumen.

It is desirable to provide a device and method for connecting to the sheathing and strength members of the protective cables while permitting the optical fibers to be broken out of the cable and transitioned to an up jacket in preparation for splicing or connecting to local equipment. It is also desirable that the device and method seal and contain the water protective substance within the lumen of the cable.

SUMMARY OF THE INVENTION

The present invention relates to an optical fiber furcation tube for transitioning an optical fiber from an optical fiber drop cable to an upjacket. The drop cable includes an exterior sheathing with at least one linear strength member and a center tube, and the optical fiber within the center tube. The upjacket includes a buffer tube for receiving the optical fiber, an exterior sheathing about the buffer tube, and a linear strength member positioned between the buffer tube and the outer sheathing.

The furcation tube includes a body defining a central channel extending from a first end through the body to a second opposing end, and an exterior. The central channel includes a first portion adjacent the first end. The first portion is sized to receive the exterior sheathing, the at least one strength member and the center tube of the optical fiber drop cable. The first portion defines a first shoulder opposite the first end. The central channel also includes a second portion adjacent the first portion and opposite the first end. The second portion is smaller in size than the first portion and sized to receive the center tube of the drop cable. The second portion defines a second shoulder opposite the first portion. The central channel also includes a third portion between the second portion and the second end. The third portion is sized to receive the buffer tube of the upjacket inserted into the central channel through the second end.

The exterior of the body adjacent the second end includes a first crimp portion to which the strength member of the upjacket may be mechanically connected.

The present application also relates to an upjacketed drop cable with the drop cable including an exterior sheathing with at least one linear strength member and a center tube, and the optical fiber within the center tube. The upjacket includes a buffer tube for receiving the optical fiber, an exterior sheathing about the buffer tube, and a linear strength member positioned between the buffer tube and the outer sheathing. A furcation tube defines a central channel extending from a first end through the furcation tube to a second opposing end, and an exterior. The central channel includes a first portion adjacent the first end defining a first shoulder opposite the first end. The central channel includes a second portion adjacent the first portion and opposite the first end defining a second shoulder opposite the first portion. The central channel also includes a third portion between the second portion and the second end sized to receive the buffer tube of the upjacket. The exterior of the furcation tube adjacent the second end includes a first crimp portion to which the strength member of the upjacket may be mechanically connected. The drop cable is inserted within the central channel and the exterior sheathing and a distal end of each of the at least one linear strength members of the drop cable potted to the furcation tube with an adhesive adjacent the first shoulder within the first portion of the central channel. A distal end of the center tube of the drop cable is potted with the adhesive adjacent the second shoulder within the second portion of the central channel.

The present invention further relates to a method of upjacketing an optical fiber of an optical fiber drop cable. The optical fiber drop cable includes a center tube defining a space within which the optical fiber extends, an exterior sheathing, and at least one linear strength member extending along the center tube beneath the exterior sheathing. An upjacket includes a hollow buffer tube sized to receive the optical fiber, an exterior sheathing and at least one linear strength member extending between the exterior sheathing and the buffer tube, the buffer tube also has a distal end extending beyond a distal end of the exterior sheathing. A furcation tube includes a first end and a second end and a center channel extending between the first and second ends. The central channel defines a first portion adjacent the first end sized to receive the drop cable, a second portion sized to receive the center tube of the drop cable and a third portion adjacent the second end sized to receive the buffer tube of the upjacket.

The buffer tube of the upjacket is advanced through the second end of the furcation tube and into the central channel so that the distal end of the buffer tube extends beyond the first end of the furcation tube.

The distal end of the exterior sheathing of the upjacket is positioned adjacent the second end of the furcation tube and the at least one strength member of the upjacket is mechanically locked to an exterior of the furcation tube adjacent the second end.

The exterior sheathing, the center tube and the at least one strength member of the drop cable are stripped from about the optical fiber to expose a desired length of optical fiber beyond a distal end of the center tube. A distal end of the at least one strength member is stripped further back than distal end of the center tube and a distal end of the exterior sheathing is stripped back further than the distal end of the at least one strength member.

The optical fiber of the drop cable is threaded into the distal end of the buffer tube and the optical fiber is advanced within the buffer tube until the distal ends of the exterior sheathing, the at least one strength member and the center tube of the drop cable are adjacent the first end of the furcation tube. An adhesive is inserted within the central channel about the buffer tube of the upjacket.

The distal ends of the exterior sheathing, and the at least one strength member are advanced into the first portion of the central channel, and the distal end of the center tube are advanced into the second portion of the central channel. The adhesive seals the distal end of the center tube and flows about the center tube, the at least one strength member, and the exterior sheathing of the drop tube toward the first end of the furcation tube.

The present invention still further relates to an upjacketed fiber optic drop cable. The fiber optic drop cable includes a fiber tube, at least one strength member extending along the fiber tube, an exterior sheathing about the fiber tube and the at least one strength member, and an optical fiber extending within the fiber tube. An upjacket includes a buffer tube and an exterior sheathing with at least one strength member extending along the buffer tube within the exterior sheathing. The buffer tube is sized to receive the optical fiber of the drop cable.

A furcation tube includes a first end and a second end and a channel extending between the first and second ends. A distal end of the buffer tube extends through the second end of the furcation tube through the channel and beyond the first end of the furcation tube. A distal end of the exterior sheathing of the upjacket is positioned adjacent the second end of the furcation tube and the at least one strength member of the upjacket crimped about a first crimp portion on an exterior of the furcation tube adjacent the second end.

The optical fiber extends from a distal end of the fiber tube of the drop cable through the distal end of the buffer tube of the upjacket. An adhesive is within the central channel about the buffer tube of the upjacket, and about the center tube, the at least one strength member, and the exterior sheathing of the drop cable.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figures 1, 2:
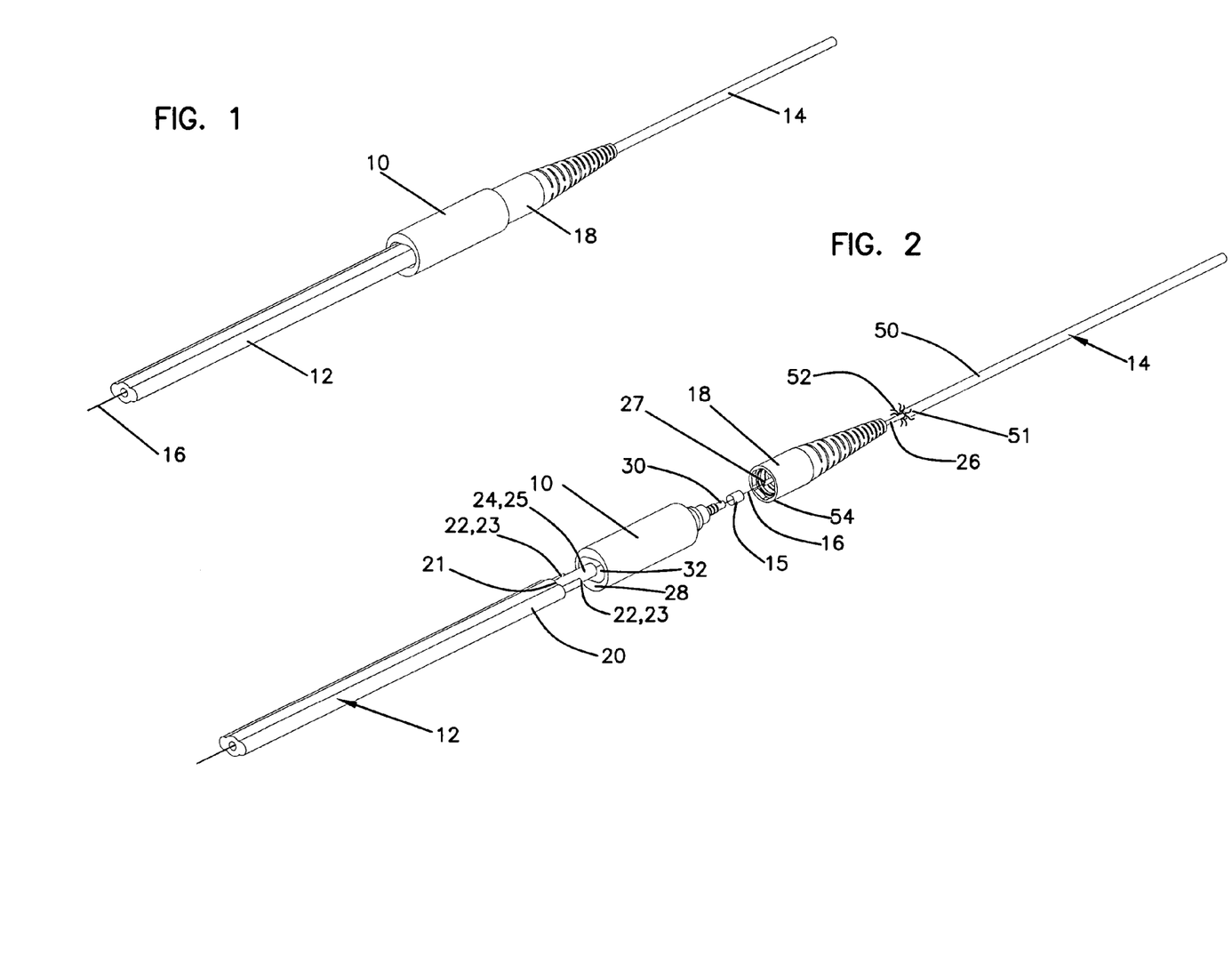
FIG. 1 is a perspective view of an upjacketed optical fiber drop cable with a furcation tube used to upjacket an optical fiber within the drop cable to a smaller diameter cable.
FIG. 2 is an exploded view of the upjacketed optical fiber drop cable of FIG. 1.
Figures 3, 4, 5:
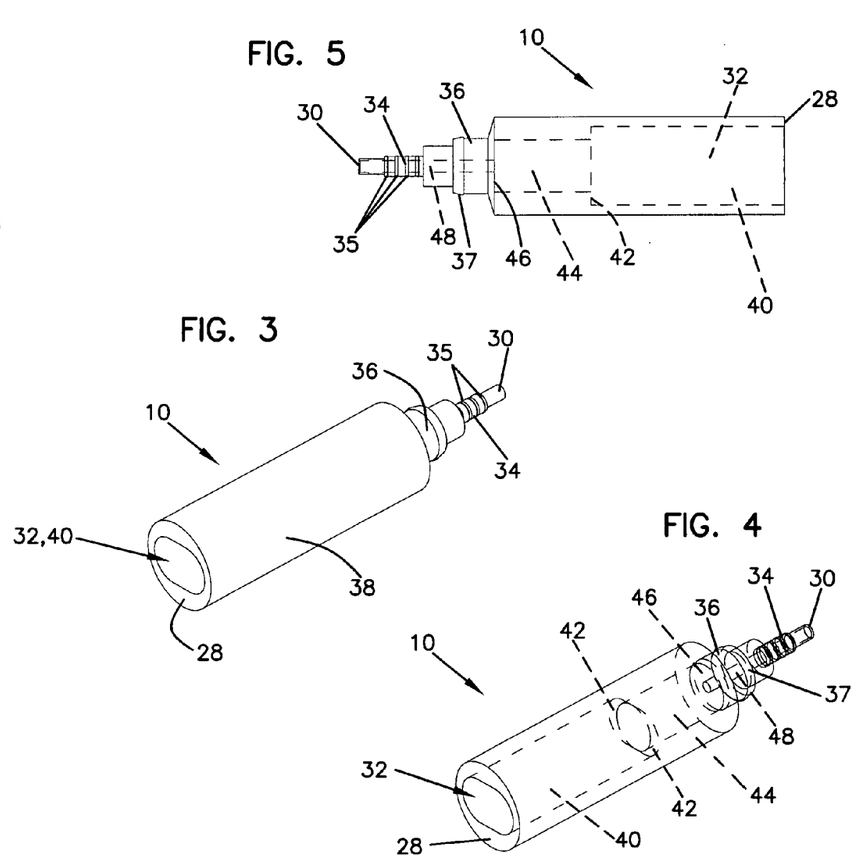
FIG. 3 is a perspective view of the furcation tube of FIG. 2.
FIG. 4 is a perspective view of the furcation tube of FIG. 3, with hidden lines showing a center channel with the body of the furcation tube.
FIG. 5 is a top view of the furcation tube of FIG. 4.
Figure 6:
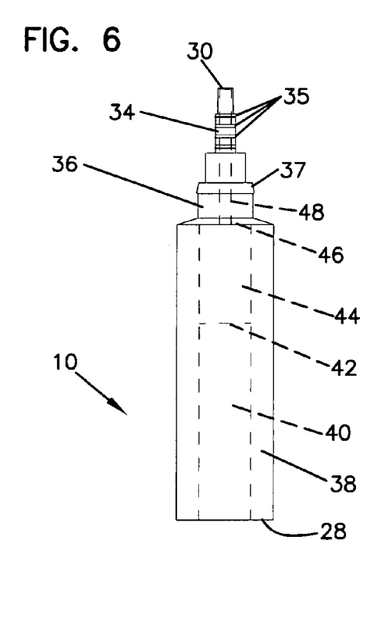
FIG. 6 is a side view of the furcation tube of FIG. 4.
Figure 7:
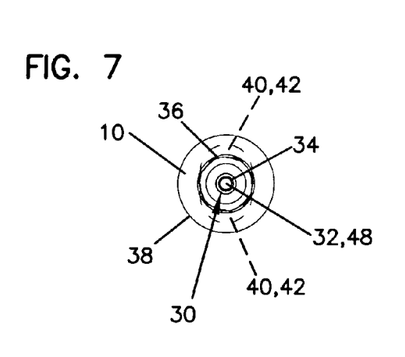
FIG. 7 is an end view of the furcation tube of FIG. 4.
Figure 8:
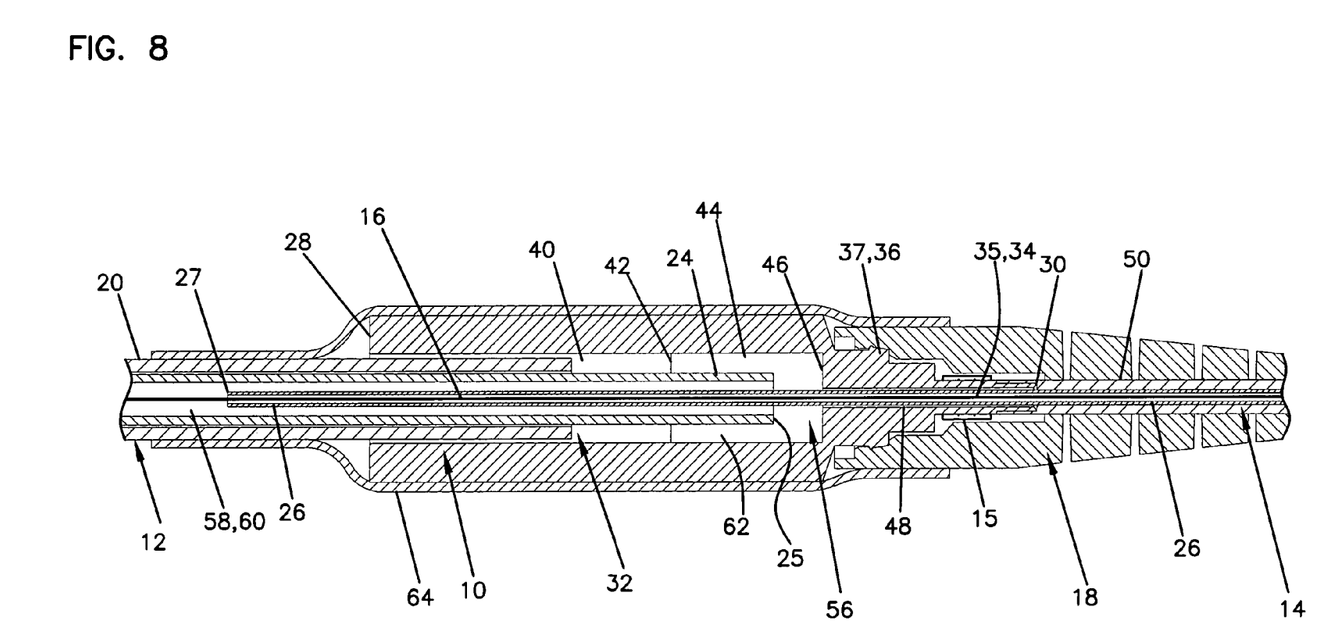
FIG. 8 is a cross-sectional side view of the furcation tube, optical fiber drop cable and upjacket of FIG. 1.

Referring now to FIG. 1, a drop cable 12 including an optical fiber 16 is connected to a smaller diameter upjacket 14 through a furcation device or tube 10. A strain relief boot 18 is positioned about optical fiber 16 and upjacket 14. Such an arrangement might be used to transition an optical fiber telecommunication circuit from a more rugged distribution cable, such as drop cable 12, to a smaller, more flexible cable, such as upjacket 14. Drop cable 12 might be an aerial cable or an underground cable extending from a fiber distribution terminal to a fiber access terminal for connection to a smaller, more flexible and less rugged cable for extending to a piece of terminal equipment at a customer's residence or business. This smaller cable may be a combination of fiber 16 extending through upjacket 14, as shown in FIGS. 2 and 8.

Referring now also to FIG. 2, drop cable 12 includes an external sheathing 20 surrounding a pair of linearly extending strength members 22 and a center or fiber tube 24 within which fiber 16 extends. Strength members 22 may be stranded fiberglass or other similarly flexible and resilient low-stretch materials. Alternatively, strength members 22 could be constructed of some form of low-stretch fiber material, such as an aramid fiber or other manmade fibers, or braided metal. Alternatively, drop cable 12 could include a plurality of linearly extending fibers evenly positioned about center tube 24 under exterior sheathing 20, rather than two large members 22 extending along opposite sides. Such rugged drop cables are well known in the telecommunications industry.

As shown in FIG. 2, exterior sheathing 20 includes a distal end 21, each of the strength members 22 has a distal end 23 and center tube 24 includes a distal end 25. Upjacket 14 includes an exterior sheathing 50 and a buffer tube 26 into which fiber 16 may extend. Buffer tube 26 includes a distal end 27 and is shown as a 900 micron buffer tube. It is anticipated that other configurations and sizes of buffer tube may be used. Extending between exterior sheathing 50 and buffer tube 26 may be a plurality linearly extending strength members, such as fibers 52. Fibers 52 may be aramid or other high strength, low-stretch fibers. Cable construction such as shown in upjacket 14 are well known in the telecommunications industry.

Furcation tube 10 includes a first end 28, a second end 30, and a central channel 32. The various components of drop cable 12 are inserted through first end 28 into central channel 32. One of the components of drop cable 12, fiber 16, extends through central channel 32 the entire length of furcation tube 10 and emerges through second end 30. Portions of drop cable 12, not including fiber 16, may be physically connected to furcation tube 10. As will be described further below, an adhesive, such as epoxy, is used in central channel 32 of furcation tube 10 to connect or pot these components of drop cable 12 to furcation tube 10.

Upjacket 14 is then positioned about fiber 16, with fiber 16 extending within buffer tube 26. Buffer tube 26 of upjacket 14 may extend within and through central channel 32 of furcation tube 10 into center tube 24 of drop cable 12, providing a smooth, protected transition for fiber 16 from drop cable 12 into upjacket 14. Upjacket 14 may be physically connected to second end 30 of furcation tube 10, such as by crimping by a crimp ring 15 or otherwise connecting fibers 52 to a portion of furcation 10 adjacent second end 30. Strain relief boot 18 may be positioned about upjacket 14 and connected to another portion of furcation tube 10 adjacent second end 30. The portions of furcation tube 10 to which upjacket 14 and strain relief boot 18 may attach are described in further detail below.

Referring now to FIGS. 3 to 7, furcation tube 10 includes a body with an exterior 38 including a first crimp portion 34 and a second crimp portion 36 adjacent second end 30. First connection or crimp portion 34 immediately adjacent second end 30 is positioned so that fibers 52 of upjacket 14 may be mechanically connected to furcation tube 10. First crimp portion 34 may include a plurality of ridges 35 or similar surface treatments to enhance the connection between fibers 52 and furcation tube 10. Second connection portion 36 is adapted to receive a wide end 54 of strain relief boot 18 and connect strain relief boot 18 to furcation tube 10. A ridge 37 may be included in second connection portion 36 to enhance the connection of strain relief boot 18 to furcation tube 10.

Referring now to FIGS. 4 to 7, center channel 32 includes a first portion 40, a second portion 44 and a third portion 48. A first shoulder 42 is defined between portions 40 and 44, and a second shoulder 46 is defined between portions 44 and 48. First portion 40 extends from first end 28 into furcation tube 10 to first shoulder 42. First portion 40 is sized to receive drop cable 12, including exterior sheathing 20, strength members 22 and center tube 24. As strength members 22 are positioned along opposite sides of drop cable 12, first portion 40 defines an oblong or oval cross-section. Alternatively, other cross-sectional shapes for first portion 40 are anticipated to correspond to the size and shape of drop cable 12. First shoulder 42 defines a limit of insertion of strength members 22 within central channel 32.

Second portion 44 extends between first shoulder 42 and second shoulder 46. Second portion 44 is sized to receive center tube 24 of drop cable 12 but is not sized or shaped to receive exterior sheathing 20 or strength members 22. During assembly of drop cable 12, furcation tube 10 and upjacket 14, exterior sheathing 20 and strength members 22 are trimmed as shown in FIG. 2, with distal ends 21 and 23, respectively, at varying offsets from distal end 25 of center tube 24. When inserted within central channel 32, as shown in FIG. 8, distal end 21 of exterior sheathing 20 is positioned at an intermediate point within first portion 40, between first end 28 and first shoulder 42. Distal ends 23 of strength members 22 are positioned within first portion 40 adjacent first shoulder 42. Distal end 25 of center tube 24 is positioned within second portion 44 between first shoulder 42 and second shoulder 46.

Third portion 48 extends from second shoulder 46 through the remainder of furcation tube 10 to second end 30. As shown, third portion 48 is sized to buffer tube 26 of upjacket 14 to extend from second end 30 into furcation tube 10 and within center tube 24 of drop cable 12. Drop cable 12 is trimmed as shown in FIG. 2 so that fiber 16 extends beyond distal end 25 of buffer 24. Optical fiber 16 is threaded within buffer tube 26 of upjacket 14 and distal end 27 of buffer tube 26 is inserted through third portion 48 of central channel 32 and through distal end 25 into center tube 24. Center tube 24 of drop cable 12 is sized to provide a space 58 within center tube 24 to receive buffer tube 26 of upjacket 14 about fiber 16. This space 58 about fiber 16 within center tube 24 of drop cable 12 may be filled with a water blocking gel 60, which may extend the length of drop cable 12. The purpose of gel 60 is to prevent entry of water within space 58 about fiber 16. It is well known in the telecommunications industry that the presence of water about fiber 16 may cause issues with the transmission of optical signals through fiber 16.

When drop cable 12 is terminated, such as shown within furcation tube 10, gel 60 may be allowed to escape through distal end 25 unless some form of seal is provided. Within central channel 32, as shown in FIG. 8, a space 56 is defined between distal end 25 and second shoulder 46 when exterior sheathing 20, strength members 22 and center tube 24 of drop cable 12 are fully inserted within central channel 32 with distal ends 23 of strength members 22 adjacent first shoulder 42. Space 56 is provided within central channel 32 to permit an adhesive 62 to be inserted adjacent distal end 25 of center tube 24 and seal distal end 25 to prevent the escape of gel 60. First and second portions 40 and 44 of central channel 32 are sized so that adhesive 62 is able to flow about drop cable 12 toward first end 28. Within central channel 32, adhesive 62 will contact and connect with exterior sheathing 20 adjacent distal end 21, strength members 22 adjacent distal ends 23, and center tube 24 adjacent distal end 25. Adhesive 62 will thereby provide the physical connection between drop cable 12 and furcation tube 10. Adhesive 62 will also flow about at least a portion of buffer tube 26 of upjacket 14 within space 56 to aid the mechanical connection of upjacket 14 to furcation tube 10. Currently, adhesive 62 is a two-part epoxy, such Hysol E-20 HP, from Loctite Corporation. Other adhesives may be used, including single part adhesives or non-epoxy alternatives, which provide sufficient strength of bond to secure drop cable 12 to furcation tube 10.

Also as shown in FIG. 8, strain relief boot 18 is engaging second crimp portion 36 about ridge 37. Exterior sheathing 50 and fibers 52 of upjacket 14 are engaging first crimp portion 34 about ridges 35.

To assemble furcation tube 10 with drop cable 12 and upjacket 14, as shown in FIGS. 1, 2 and 8, portions of strength members 22, exterior sheathing 20 and center tube 24 of drop cable 12 are trimmed back as shown to expose the desired length of optical fiber 16 beyond distal end 25 of center tube 24. As center tube 24 is filled with water blocking gel 60, fiber 16 will need to be cleaned of any gel residue prior to assembly. Upjacket 14 is trimmed so that a desired length of buffer tube 26 (similar in length to the length of fiber 16 exposed) and fibers 52 extend beyond a distal end 51 of exterior sheathing 50. Buffer tube 26 of upjacket 14 is threaded through second end 30 of furcation tube 10 and through central channel 32, so that distal end 27 extends beyond first end 28 of furcation tube 10. Distal end 51 of exterior sheathing 50 is positioned adjacent second end 30 of furcation tube 10 so that fibers 52 of upjacket 14 lay about first crimp portion 34. Crimp ring 15 is placed about fibers 52 and first crimp portion 34 and compressed to mechanically lock fibers 52 to furcation tube 10. As shown, fiber 16 is a 250 micron optical fiber and buffer tube 26 is a 900 micron buffer tube, sized to fit about a 250 micron optical fiber. Both of these are well known in the telecommunications industry. Others compatible sizes and styles of optical fiber and buffer tube may be used.

Fiber 16 is threaded through distal end 27 of buffer tube 26. Fiber 16 is then advanced through buffer tube 26 of upjacket 14 until distal ends 21, 23, and 25, of outer sheathing 20, strength members 22 and center tube 24 are adjacent first end 28 of furcation tube 10. At this point, distal end 27 of buffer tube 26 should be adjacent to distal end 25 of center tube 24, or within center tube 24 in space 58 about fiber 16. Adhesive 62 is placed within central channel 32 and the distal ends of drop cable 12 are moved into central channel 32 to the position shown in FIG. 8.

Fiber 16 is protected from exposure to adhesive 62 by buffer tube 26. As distal ends 21, 23 and 25 of drop cable are directed into central channel 32, distal end 27 of buffer tube 26 will advance beyond distal end 25 of center tube 24 within space 58. Adhesive 62 within central channel 32 will be displaced by the insertion of drop cable 12 into central channel 32 and preferably spread throughout all portions of central channel 32 and flow slightly beyond first end 28, indicating that adhesive 62 has filled all of the spaces within central channel 32. Upon curing of adhesive 62, furcation tube 10 will be securely mounted to both drop cable 12 and upjacket 14. Strain relief boot 18 may be slid along upjacket 14 to engage second connection portion 36 to complete the assembly as shown in FIGS. 1, 2, and 8. It is anticipated that a heat shrink material 64 may be positioned about drop cable 12, furcation tube 10 and upjacket 14 to provide a smoother, finished outer surface and also to contain any adhesive 62 that may flow out of furcation tube 10 while the adhesive is curing.

In the above description, strength members 22 and 52 of drop cable 12 and upjacket 14, respectively, have been described as linear members. It is anticipated that other woven or braided materials may be suitable for use as strength members within drop cable 12 and upjacket 14. The reference to linear only is intended to indicate that the strength members extend generally along the length of drop cable 12 and upjacket 14 and not to limit the nature and physical characteristics of the materials from which the strength members are constructed.

It is anticipated that furcation tube 10 may be made of a durable metallic material, such as brass, or phos bronze, or similar materials. It is also anticipated that furcation 10 could include more than one second end 30 for receiving more than one upjacket 14. Drop cable 12 might include two or more optical fibers extending within the same fiber tube 24 or may include more than one fiber tubes 24 within each of which are an optical fiber 16. An upjacket 14 could be connected to each of the second ends 30 and each of the multiple fibers 16 with drop cable 12 could be upjacketed.

The above specification, examples and data provide a complete description of the manufacture and use of the invention. Since many embodiments of the invention can be made without departing from the spirit and scope of the invention, the invention resides in the claims hereinafter appended.

What is claimed is:

1. An optical fiber furcation tube for transitioning an optical fiber from an optical fiber drop cable to an upjacket, the drop cable including an exterior sheathing, at least one linear strength member, a center tube, and an optical fiber within the center tube, the upjacket including a buffer tube for receiving the optical fiber, an exterior sheathing about the buffer tube, and a linear strength member positioned between the buffer tube and the exterior sheathing, the furcation tube comprising:
   a body defining a central channel extending from a first end through the body to a second opposing end, and an exterior;
   the central channel including a first portion adjacent the first end, the first portion sized to receive the exterior sheathing of the optical fiber drop cable that includes the at least one strength member and the center tube, the first portion defining a first shoulder opposite the first end;
   the central channel including a second portion adjacent the first portion and opposite the first end, the second portion smaller in size than the first portion and sized to receive the center tube of the drop cable, the second portion defining a second shoulder opposite the first portion;
   the central channel including a third portion between the second portion and the second end, the third portion sized to receive the buffer tube of the upjacket inserted into the central channel through the second end;
   the exterior of the body adjacent the second end including a first crimp portion to which the strength member of the upjacket may be mechanically connected; and
   wherein the exterior of the body includes a second connection portion configured to receive and retain a strain relief boot positioned about the upjacket.

2. An upjacketed optical fiber drop cable comprising:
   a drop cable including an exterior sheathing with at least one linear strength member, a center tube, and an optical fiber within the center tube;
   an upjacket including a buffer tube for receiving the optical fiber, an exterior sheathing about the buffer tube, and a linear strength member positioned between the buffer tube and the exterior sheathing;
   a furcation tube defining a central channel extending from a first end through the furcation tube to a second opposing end, and an exterior;
     the central channel including a first portion adjacent the first end, the first portion sized to receive the exterior sheathing, the at least one strength member and the center tube of the optical fiber drop cable, the first portion defining a first shoulder opposite the first end;
     the central channel including a second portion adjacent the first portion and opposite the first end, the second portion smaller in size than the first portion and sized to receive the center tube of the drop cable, the second portion defining a second shoulder opposite the first portion;
     the central channel including a third portion between the second portion and the second end, the third portion sized to receive the buffer tube of the upjacket inserted into the central channel through the second end; and
     the exterior of the furcation tube adjacent the second end including a first crimp portion to which the strength member of the upjacket may be mechanically connected; and
   the drop cable inserted within the central channel and the exterior sheathing and a distal end of each of the at least one linear strength members of the drop cable potted to the furcation tube with an adhesive adjacent the first shoulder within the first portion of the central channel, and a distal end of the center tube of the drop cable potted with the adhesive adjacent the second shoulder within the second portion of the central channel; and
   wherein the center tube of the drop cable defines an interior space within which the optical fiber extends and a water sealing gel within the center tube of the drop cable fills any space about the optical fiber within the center tube, and the adhesive within the central channel prevents the water sealing gel from escaping from the center tube within the central channel of the furcation tube.

3. The upjacketed optical fiber drop cable of claim 2, wherein the buffer tube of the upjacket is positioned about the optical fiber and is inserted within the center tube of the drop cable, and the strength member of the upjacket is crimped to the first crimp portion of the body.

4. The upjacketed optical fiber drop cable of claim 3, wherein the exterior of the furcation tube includes a second connection portion adjacent the first crimp portion, and a strain relief boot is positioned about the upjacket and connected to the second connection portion.

5. The upjacketed optical fiber drop cable of claim 4, wherein a heat shrink material is placed about the furcation tube and extends about at least a portion of the drop cable adjacent the furcation tube and at least a portion of the strain relief boot adjacent the furcation tube.

6. The upjacketed optical fiber drop cable of claim 2, wherein the drop cable includes a pair of linear strength members on opposite sides of the center tube, and wherein the first portion of the central channel defines a generally oval cross-section permitting a distal end of each of the strength members of the drop cable to be potted with an adhesive adjacent the first shoulder.

7. A method of upjacketing an optical fiber of an optical fiber drop cable comprising:

providing the optical fiber drop cable with a center tube defining a space within which the optical fiber extends, an exterior sheathing, and at least one linear strength member extending along the center tube beneath the exterior sheathing;

providing an upjacket including a hollow buffer tube sized to receive the optical fiber, an exterior sheathing and at least one linear strength member extending between the exterior sheathing and the buffer tube, the buffer tube having a distal end extending beyond a distal end of the exterior sheathing;

providing a furcation tube with a first end and a second end, an center channel extending between the first and second ends, the central channel defining a first portion adjacent the first end sized to receive the drop cable, a second portion sized to receive the center tube of the drop cable and a third portion adjacent the second end sized to receive the buffer tube of the upjacket;

advancing the buffer tube of the upjacket through the second end of the furcation tube and into the central channel so that the distal end of the buffer tube extends beyond the first end of the furcation tube;

positioning the distal end of the exterior sheathing of the upjacket adjacent the second end of the furcation tube and mechanically locking the at least one strength member of the upjacket to an exterior of the furcation tube adjacent the second end;

stripping the exterior sheathing, the center tube and the at least one strength member of the drop cable from about the optical fiber to expose a desired length of optical fiber beyond a distal end of the center tube, a distal end of the at least one strength member stripped further back than distal end of the center tube and a distal end of the exterior sheathing stripped back further than the distal end of the at least one strength member;

inserting the optical fiber of the drop cable into the distal end of the buffer tube and advancing the optical fiber within the buffer tube until the distal ends of the exterior sheathing, the at least one strength member and the center tube are adjacent the first end of the furcation tube;

inserting an adhesive within the central channel about the buffer tube of the upjacket; and advancing the distal ends of the exterior sheathing, and the at least one strength member into the first portion of the central channel, and the distal end of the center tube into the second portion of the central channel, the adhesive sealing the distal end of the center tube and flowing about the center tube, the at least one strength member, and the exterior sheathing toward the first end of the furcation tube.

8. The method of claim 7, further comprising providing a strain relief boot positioned about the upjacket, and connecting the strain relief boot to the exterior of the furcation tube adjacent the second end.

9. The method of claim 8, further comprising positioning and shrinking a heat shrink tube about closely about the furcation tube and the strain relief boot, and a portion of the drop cable and the upjacket.

10. The method of claim 7, wherein the at least one strength member of the upjacket is mechanically locked to the furcation tube by a crimp ring, the crimp ring positioned and compressed about the at least one strength member and a crimp portion on an exterior of the furcation tube adjacent the second end.

11. An upjacketed fiber optic drop cable comprising:

a fiber optic drop cable including a fiber tube, at least one strength member extending along the fiber tube, an exterior sheathing about the fiber tube and the at least one strength member, and an optical fiber extending within the fiber tube;

an upjacket including a buffer tube and an exterior sheathing with at least one strength member extending along the buffer tube within the exterior sheathing, the buffer tube sized to receive the optical fiber of the drop cable;

a furcation tube with a first end and a second end, and a channel extending between the first and second ends;

a distal end of the buffer tube extending through the second end of the furcation tube through the channel and beyond the first end of the furcation tube;

a distal end of the exterior sheathing of the upjacket adjacent the second end of the furcation tube and the at least one strength member of the upjacket crimped about a first crimp portion on an exterior of the furcation tube adjacent the second end;

the optical fiber extending from a distal end of the fiber tube of the drop cable and through the distal end of the buffer tube of the upjacket;

a distal end of the fiber tube, a distal end of the at least one strength member and a distal end of the exterior sheathing positioned through the first end of the furcation tube within the channel;

an adhesive within the channel about the buffer tube of the upjacket, and about the fiber tube, the at least one strength member, and the exterior sheathing of the drop cable; and a strain relief boot positioned about the upjacket and connected to a second connection portion on an exterior of the furcation tube adjacent the second end of the furcation tube.

12. The upjacketed drop cable of claim 11, further comprising a heat shrink material positioned about the furcation tube, at least a portion of the drop cable, and the strain relief boot.

13. The upjacketed drop cable of claim 11, wherein the fiber tube of the drop cable includes a water resistant gel about the optical fiber and the adhesive within the channel seals the distal end of the fiber tube of the drop cable against escape of the water resistant gel from the fiber tube.

14. The upjacketed drop cable of claim 11, wherein the drop cable includes a pair of strength members on either side of the fiber tube within the exterior sheathing.

15. The upjacketed drop cable of claim 11, wherein the upjacket includes a plurality of aramid fibers along the buffer tube within the exterior sheathing.

16. The upjacketed drop cable of claim 11, wherein first and second shoulders are defined within the channel.

17. An optical fiber furcation tube for transitioning an optical fiber from a drop cable to an upjacket, the furcation tube comprising:

a body including a first end configured to receive an optical fiber drop cable, a second end configured to engage an upjacket, and a channel extending between the first end and the second end, the channel comprising:
  a first end portion adjacent the first end, the first portion having in internal cross-sectional shape that corresponds to the cross-sectional shape of the optical fiber drop cable;
  a second end portion adjacent the second end, the second portion configured to receive a buffer tube of an upjacket; and
  a mid-portion positioned between the first and second end portions, the mid-portion being configured to receive a center tube of the optical fiber drop cable and including a substantially enclosed cross-sectional area that is less than a cross-sectional area of the first portion;
a crimp portion located on an exterior of the body adjacent the second end, the first crimp portion configured to mechanically connect to a strength member of the upjacket; and
wherein a first shoulder is defined within the channel between the first end portion and the mid-portion, and a second shoulder is defined within the channel between the mid-portion and the second end portion.

18. An upjacketed optical fiber drop cable comprising:
a drop cable including an exterior sheathing with at least one linear strength member, a center tube, and an optical fiber within the center tube;
an upjacket including a buffer tube for receiving the optical fiber, an exterior sheathing about the buffer tube, and a linear strength member positioned between the buffer tube and the exterior sheathing;
a furcation tube including a first end receiving the drop cable, a second end receiving the upjacket, and a channel extending from the first end to the second end, the channel including:
  a first end portion adjacent the first end;
  a second end portion adjacent the second end; and
  a mid-portion positioned between the first and second end portions, the mid-portion including a cross-sectional area that is less than a cross-sectional area of the first portion;
a crimp portion located on an exterior of the body adjacent the second end, the first crimp portion being mechanically connected to a strength member of the upjacket; and
wherein the drop cable is inserted within the channel and the exterior sheathing and the at least one linear strength member of the drop cable is potted with an adhesive within the first end portion of the central channel, and the center tube of the drop cable is potted with an adhesive within the mid-portion of the central channel.

19. The upjacketed optical fiber drop cable of claim 18, wherein the buffer tube of the upjacket is positioned about the optical fiber and is inserted within the center tube of the drop cable, and the strength member of the upjacket is crimped to the first crimp portion of the body.

20. The upjacketed optical fiber drop cable of claim 18, wherein the drop cable includes a pair of linear strength members located on opposite sides of the center tube, and wherein the first end portion of the central channel defines a generally oval cross-section.

21. An upjacketed optical fiber drop cable comprising:
a drop cable including an exterior sheathing with at least one linear strength member, a center tube, and an optical fiber within the center tube;
an upjacket including a buffer tube for receiving the optical fiber, an exterior sheathing about the buffer tube, and a linear strength member positioned between the buffer tube and the exterior sheathing;
a furcation tube defining a central channel extending from a first end through the furcation tube to a second opposing end, and an exterior;
  the central channel including a first portion adjacent the first end, the first portion sized to receive the exterior sheathing, the at least one strength member and the center tube of the optical fiber drop cable, the first portion defining a first shoulder opposite the first end;
  the central channel including a second portion adjacent the first portion and opposite the first end, the second portion smaller in size than the first portion and sized to receive the center tube of the drop cable, the second portion defining a second shoulder opposite the first portion;
  the central channel including a third portion between the second portion and the second end, the third portion sized to receive the buffer tube of the upjacket inserted into the central channel through the second end; and
  the exterior of the furcation tube adjacent the second end including a first crimp portion to which the strength member of the upjacket may be mechanically connected; and
the drop cable inserted within the central channel and the exterior sheathing and a distal end of each of the at least one linear strength members of the drop cable potted to the furcation tube with an adhesive adjacent the first shoulder within the first portion of the central channel, and a distal end of the center tube of the drop cable is potted with the adhesive adjacent the second shoulder within the second portion of the central channel, wherein the buffer tube of the upjacket is positioned about the optical fiber and is inserted within the center tube of the drop cable, and the strength member of the upjacket is crimped to the first crimp portion of the body and, wherein the exterior of the furcation tube includes a second connection portion adjacent the first crimp portion, and a strain relief boot is positioned about the upjacket and connected to the second connection portion.

22. An upjacketed fiber optic drop cable comprising:
a fiber optic drop cable including a fiber tube, at least one strength member extending along the fiber tube, an exterior sheathing about the fiber tube and the at least one strength member, and an optical fiber extending within the fiber tube;
an upjacket including a buffer tube and an exterior sheathing with at least one strength member extending along the buffer tube within the exterior sheathing, the buffer tube sized to receive the optical fiber of the drop cable;
a furcation tube with a first end and a second end, and a channel extending between the first and second ends;
a distal end of the buffer tube extending through the second end of the furcation tube through the channel and beyond the first end of the furcation tube;
a distal end of the exterior sheathing of the upjacket adjacent the second end of the furcation tube and the at least one strength member of the upjacket crimped about a first crimp portion on an exterior of the furcation tube adjacent the second end;

the optical fiber extending from a distal end of the fiber tube of the drop cable and through the distal end of the buffer tube of the upjacket;

a distal end of the fiber tube, a distal end of the at least one strength member and a distal end of the exterior sheathing positioned through the first end of the furcation tube within the channel;

an adhesive within the channel about the buffer tube of the upjacket, and about the fiber tube, the at least one strength member, and the exterior sheathing of the drop cable; and wherein the upjacket further comprises a heat shrink material positioned about the furcation tube, at least a portion of the drop cable, and the strain relief boot.

23. An upjacketed fiber optic drop cable comprising:

a fiber optic drop cable including a fiber tube, at least one strength member extending along the fiber tube, an exterior sheathing about the fiber tube and the at least one strength member, and an optical fiber extending within the fiber tube;

an upjacket including a buffer tube and an exterior sheathing with at least one strength member extending along the buffer tube within the exterior sheathing, the buffer tube sized to receive the optical fiber of the drop cable;

a furcation tube with a first end and a second end, and a channel extending between the first and second ends;

a distal end of the buffer tube extending through the second end of the furcation tube through the channel and beyond the first end of the furcation tube;

a distal end of the exterior sheathing of the upjacket adjacent the second end of the furcation tube and the at least one strength member of the upjacket crimped about a first crimp portion on an exterior of the furcation tube adjacent the second end;

the optical fiber extending from a distal end of the fiber tube of the drop cable and through the distal end of the buffer tube of the upjacket;

a distal end of the fiber tube, a distal end of the at least one strength member and a distal end of the exterior sheathing positioned through the first end of the furcation tube within the channel;

an adhesive within the channel about the buffer tube of the upjacket, and about the fiber tube, the at least one strength member, and the exterior sheathing of the drop cable; and wherein the fiber tube of the drop cable includes a water resistant gel about the optical fiber and the adhesive within the channel seals the distal end of the fiber tube of the drop cable against escape of the water resistant gel from the fiber tube.

* * * * *